US010839016B2

(12) United States Patent
Wils

(10) Patent No.: US 10,839,016 B2
(45) Date of Patent: Nov. 17, 2020

(54) STORING METADATA IN A CUCKOO TREE

(71) Applicant: EMC IP Holding Company LLC, Hopkinton, MA (US)

(72) Inventor: Joris Wils, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 161 days.

(21) Appl. No.: 16/177,240

(22) Filed: Oct. 31, 2018

(65) Prior Publication Data

US 2020/0134100 A1 Apr. 30, 2020

(51) Int. Cl.
*G06F 16/901* (2019.01)
*G06F 3/06* (2006.01)
*G06F 16/907* (2019.01)

(52) U.S. Cl.
CPC ........ *G06F 16/9027* (2019.01); *G06F 3/0604* (2013.01); *G06F 3/0659* (2013.01); *G06F 3/0673* (2013.01); *G06F 16/907* (2019.01); *G06F 16/9014* (2019.01)

(58) Field of Classification Search
USPC .......................................................... 707/797
See application file for complete search history.

(56) References Cited

U.S. PATENT DOCUMENTS 8,478,723 B2 * 7/2013 Rousseau ................ G06F 3/064
707/633
8,880,788 B1 * 11/2014 Sundaram ........... G06F 12/0246
711/103
8,892,938 B1 * 11/2014 Sundaram ............. G06F 3/0634
714/6.21
8,977,660 B1 3/2015 Xin et al.
(Continued)

FOREIGN PATENT DOCUMENTS

WO 2018199795 A1 11/2018
WO 2018199796 A1 11/2018

OTHER PUBLICATIONS

Wils, Joris, et al.; "Systems and Methods of Amoritizing Deletion Processing of a Log Structured Storage Based Volume Virtualization," U.S. Appl. No. 15/664,852, filed Jul. 31, 2017.
(Continued)

*Primary Examiner* — Cam Linh T Nguyen
(74) *Attorney, Agent, or Firm* — BainwoodHuang

(57) ABSTRACT

Techniques for storing block-based metadata in a storage system are provided. A method includes (a) receiving a request to write a block of data to a logical address, (b) assigning a physical address where the block of data is to be stored, (c) creating a metadata entry for the block of data, the metadata entry including the physical address, (d) storing a key-value pair within a sorted key-value structure (SKVS) of an ordered plurality of SKVSes, each SKVS having a unique identifier, the key-value pair including the logical address as key and the metadata entry as value; (e) placing an entry within a Cuckoo filter based on the key, the entry including the identifier of the SKVS in which the key-value pair was stored, and (f) subsequently accessing the data by: (1) locating the metadata entry with reference to the Cuckoo filter and (2) locating the data with reference to the physical address in the metadata entry.

15 Claims, 4 Drawing Sheets

(56) References Cited

U.S. PATENT DOCUMENTS

| | | | |
|---|---|---|---|
| 8,996,535 B1 * | 3/2015 | Kimmel | G06F 3/0641 |
| | | | 707/747 |
| 8,996,797 B1 * | 3/2015 | Zheng | G06F 3/061 |
| | | | 711/103 |
| 9,223,799 B1 | 12/2015 | Veeraswamy et al. | |
| 9,311,016 B2 * | 4/2016 | Ezra | G06F 3/0683 |
| 9,424,184 B2 * | 8/2016 | Flynn | G06F 3/0619 |
| 9,720,601 B2 * | 8/2017 | Gupta | G06F 3/0635 |
| 9,740,566 B2 * | 8/2017 | Zheng | G06F 3/0659 |
| 9,785,366 B1 | 10/2017 | Morley et al. | |
| 9,823,872 B2 * | 11/2017 | Danilak | G06F 16/211 |
| 9,891,826 B1 * | 2/2018 | Um | G06F 12/10 |
| 9,952,765 B2 * | 4/2018 | Krishnamachari | G06F 3/0604 |
| 10,170,151 B2 * | 1/2019 | Aiello | G06F 3/064 |
| 10,417,213 B1 * | 9/2019 | Mukku | G06F 16/23 |
| 10,572,161 B2 * | 2/2020 | Subramanian | G06F 15/17331 |
| 2017/0371912 A1 * | 12/2017 | Kimura | G06F 3/0685 |
| 2018/0011893 A1 * | 1/2018 | Kimura | G06F 16/9027 |

OTHER PUBLICATIONS

Vankamamidi, Vamsi, et al.; "Managing Data in Log-Structured Storage Systems," U.S. Appl. No. 15/966,464, filed Apr. 30, 2018.

"Log-Structured Merge-Tree," <https://en.wikipedia.org/w/index.php?title=Log-structured_merge-tree&oldid=855020036>, Wikipedia, Aug. 2018.

Fan, Bin, et al.: "Cuckoo Filter: Practically Better Than Bloom," CoNext '14, Dec. 2014, ACM, Sydney, Australia.

* cited by examiner

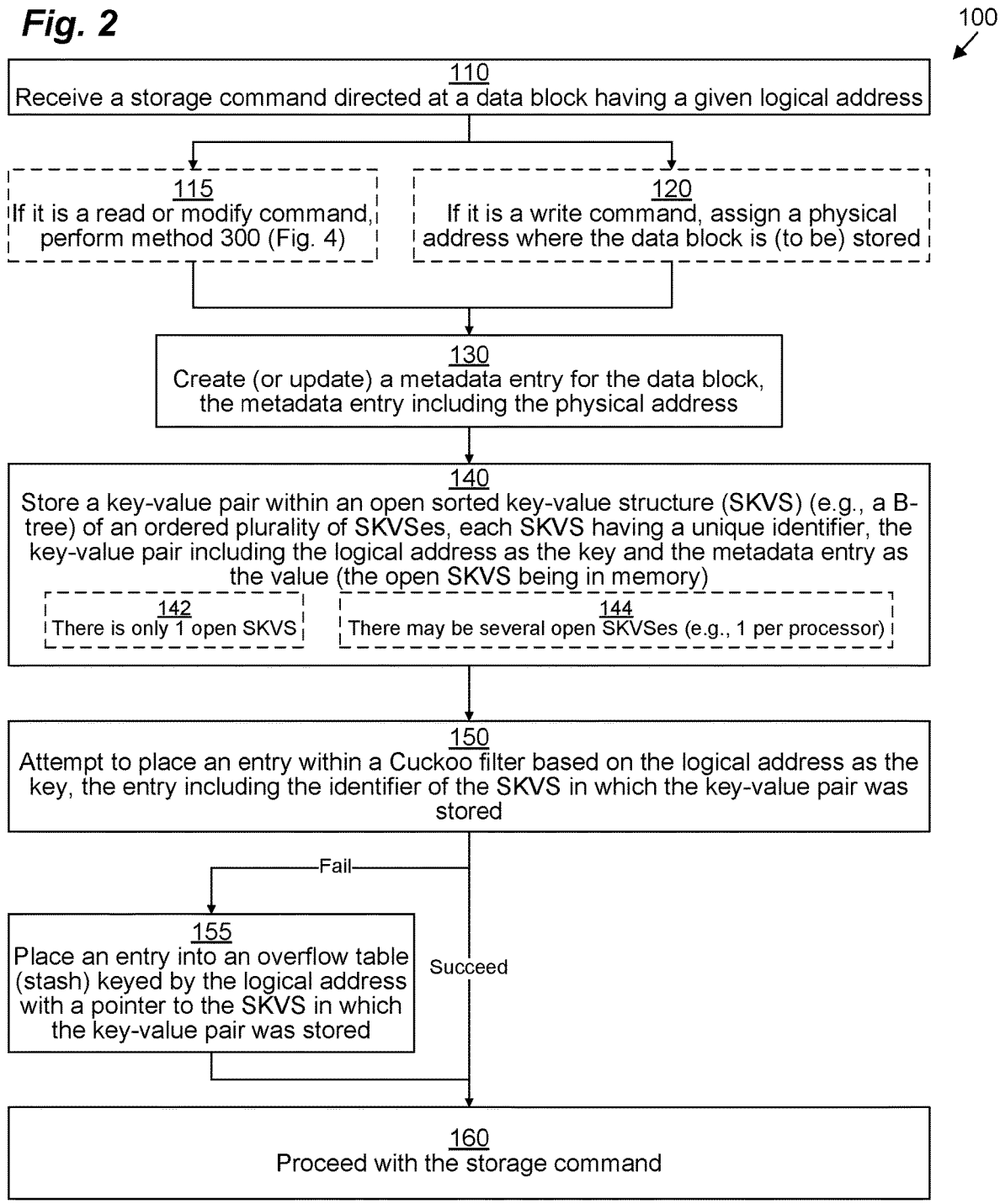

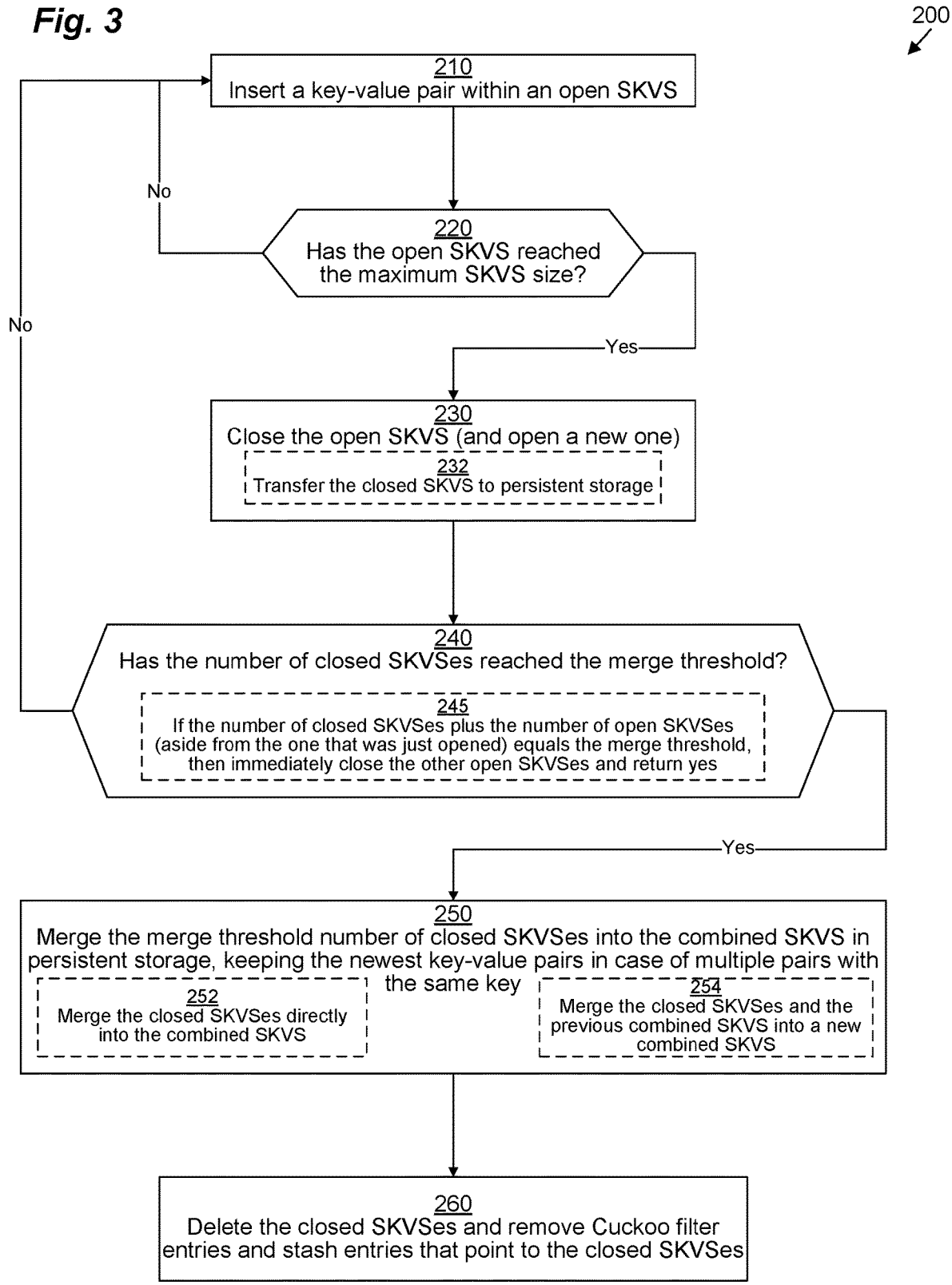

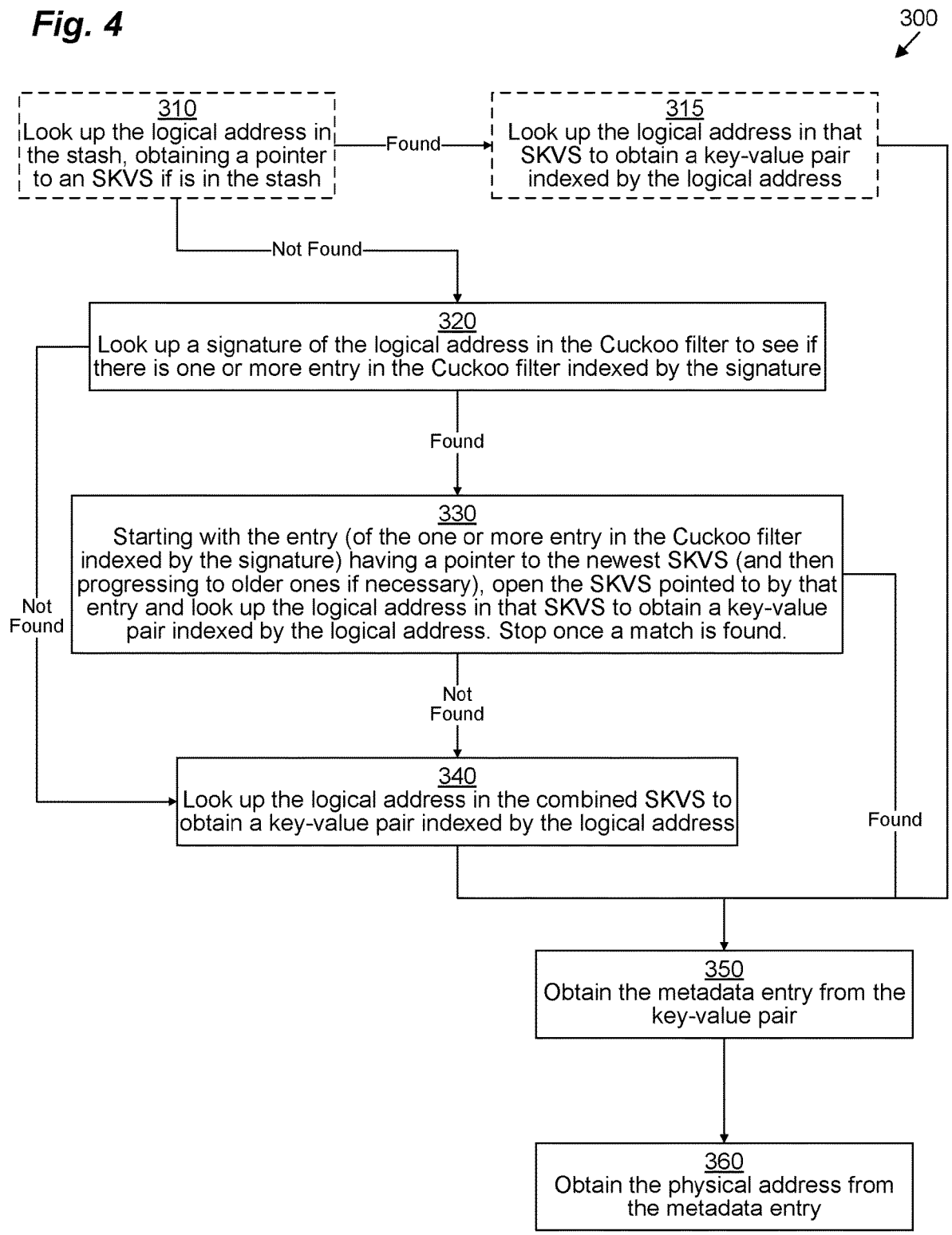

STORING METADATA IN A CUCKOO TREE

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices In addition to storing and retrieving data, Data storage systems also store metadata associated with the data in order to manage the data effectively.

SUMMARY

Many conventional data storage appliances generate large amounts of metadata. Even if the total combined size of all the metadata is low in comparison to the size of the data, a large number of small metadata entries may be required. For example, data storage appliances that employ features such as deduplication, compression, log-structured storage, and write-ahead logging often generate many small metadata updates. Because the quantities of metadata are typically too large to fit within volatile memory, the metadata must be stored, at least partially, within persistent storage. However, persistent storage is typically not optimized for frequent small writes. In addition, because access to most persistent storage is comparatively slow, it is not practical to search through many small unsorted metadata entries whenever data needs to be accessed. Thus, sorted data structures such as B-trees are often used to speed up metadata lookups.

Therefore, it would be desirable to store metadata using a scheme that allows very many entries to be written efficiently and searched quickly with low thread contention. This result may be accomplished by using a Cuckoo filter to build a Cuckoo tree to store the metadata. This scheme may also be applied to other contexts in which a database with frequent small entries is needed.

In one embodiment, a method of storing block-based metadata in a data storage system (DSS) is provided. The method includes (a) receiving a request to write a block of data to a logical address of the DSS, (b) assigning a physical address within the DSS where the block of data is to be stored, (c) creating a metadata entry for the block of data, the metadata entry including the physical address, (d) storing a key-value pair within a sorted key-value structure (SKVS) of an ordered plurality of SKVSes, each SKVS having a unique identifier, the key-value pair including the logical address as the key and the metadata entry as the value; (e) placing an entry within a Cuckoo filter based on the key value, the entry including the identifier of the SKVS in which the key-value pair was stored, and (f) subsequently accessing the data by: (1) locating the metadata entry with reference to the Cuckoo filter and (2) locating the data with reference to the physical address in the metadata entry. Systems, apparatuses, and computer program products for performing similar methods are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2 is a flowchart depicting example methods according to various embodiments.

FIG. 3 is a flowchart depicting example methods according to various embodiments.

FIG. 4 is a flowchart depicting example methods according to various embodiments.

DETAILED DESCRIPTION OF THE INVENTION

Figure 1:
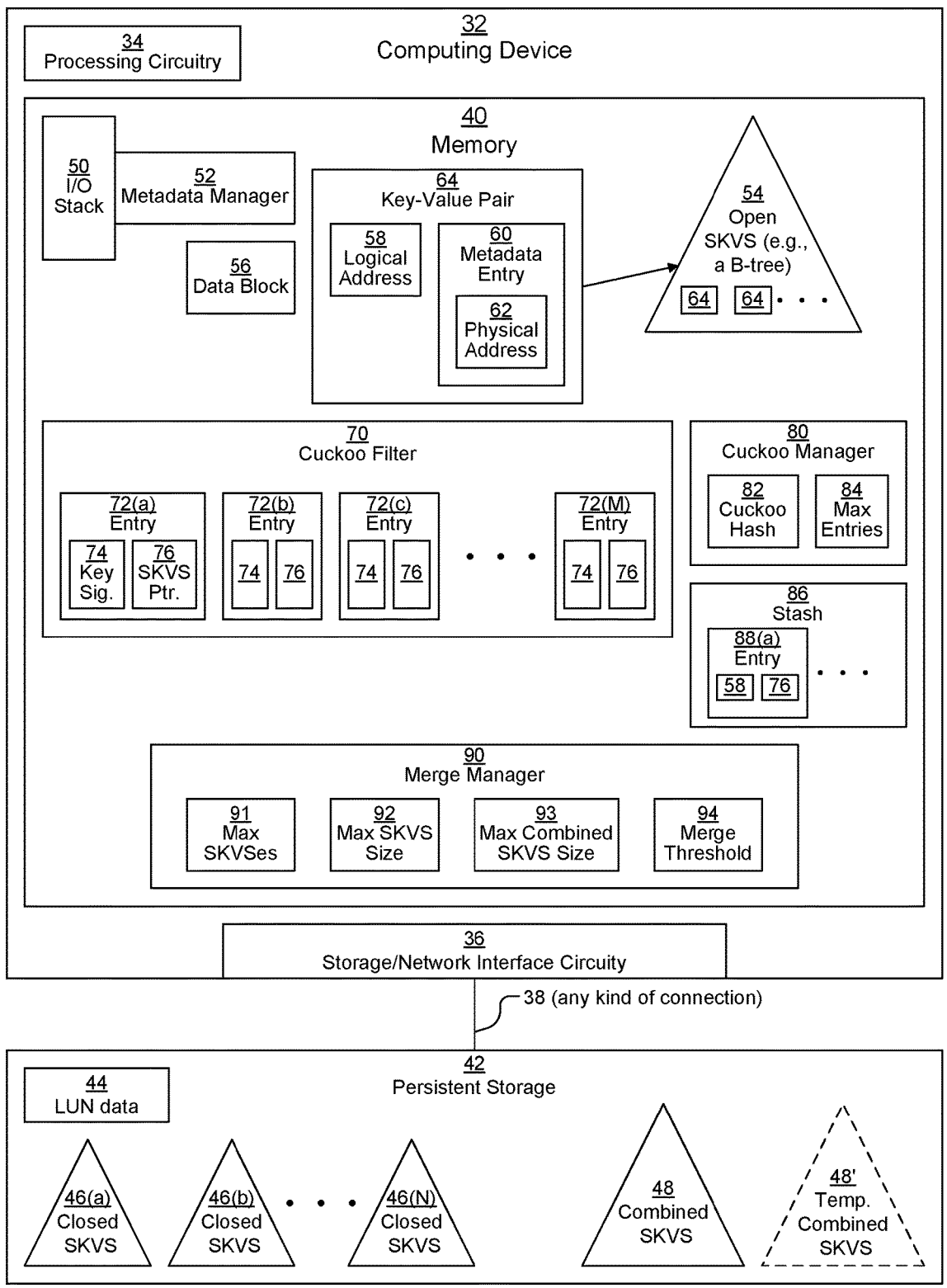
FIG. 1 is a block diagram depicting an example system and apparatuses for use in connection with various embodiments.

Embodiments are directed to techniques for storing block metadata entries using a scheme that allows very many entries to be written efficiently and searched quickly with low thread contention. This result may be accomplished by using a Cuckoo filter to build a Cuckoo tree to store the metadata. This scheme may also be applied to other contexts in which a database with frequent small entries is needed.

FIG. 1 depicts a system 30 including a computing device 32 connected to persistent data storage 42 via connection 38. In some embodiments, the persistent data storage 42 may be locally installed within the same chassis as computing device 32, while in other embodiments, the persistent data storage 42 may be external to or remote from computing device 32.

Computing device 32 may be any kind of computing device, such as, for example, a personal computer, workstation, server computer, enterprise server, data storage system (DSS) rack server, laptop computer, tablet computes, smart phone, mobile computer, etc. Typically, computing device 32 is a DSS rack server. Computing device 32 includes processing circuitry 34, storage interface and/or network interface circuitry 36, and memory 40. Computing device 32 may also include other components as are well-known in the art, including interconnection circuitry.

Processing circuitry 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface and/or network interface circuitry 36 provides access and an interface to connection 38 to persistent data storage 42 and may control persistent data storage 42. Connection 38 may be any kind of connection over which computing device 32 can communicate with persistent data storage 42 such as, for example, Ethernet cables, Wireless Fidelity (Wi-Fi) wireless connections, an IP network, SCSI cables, SATA cables, Fibre Channel (FC) cables, etc. If connection 38 is a network connection, then storage interface and/or network interface circuitry 36 may include, for example, one or more Ethernet cards, cellular modems, FC adapters, Wi-Fi wireless networking adapters, and/or other devices for connecting to a network. If connection 38 is a local storage connection, then storage interface and/or network interface circuitry 36 may include for example, SCSI, SAS, ATA, SATA, FC, and/or other similar controllers and ports.

Persistent data storage 42 may include any kind of persistent storage devices, such as, for example, hard disk drives, solid-state storage devices, flash drives, etc. Persistent data storage 42 stores user data as LUN data 44, which represents one or more logical disks accessible by users. LUN data 44 is organized and managed with reference to metadata that is stored within various data structures, including a set of closed sorted key-value structures (SKVSes) 46 and a larger combined SKVS 48, both stored on persistent storage 42, as well as within an open SKVS 54 stored within memory 40. SKVSes 46, 48, 54 may be any kind of sorted data structures configured to provide fast access to key-value pairs, such as, for example, B-trees, B+ trees, B*-trees, binary trees, etc.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores an input/output (I/O) stack 50 in operation. I/O stack 50 allows I/O requests (not depicted) from external hosts (as well as local applications) to be processed with respect to the LUN data 44 managed by the computing device 32.

Memory 40 also stores metadata manager 52, Cuckoo manager 80, and merge manager 90 in operation. In some embodiments, metadata manager 52 is part of I/O stack 50, and in other embodiments, metadata manager 52 operates as an external driver called by I/O stack 50. Metadata manager 52 operates to generate and manage metadata for each data block 56 processed by the I/O stack 50. Metadata manager 52 operates to create a metadata entry 60 that includes various metadata about the block 56, such as, for example, the physical address 62 where the data block 56 is stored in persistent storage 42. In some embodiments, metadata entry 60 also includes statistics information, a timestamp, checksum, block length, and compression algorithm (all not depicted). In one embodiment, each metadata entry 60 is 24 bits long, including 8 bits for the physical address 62.

Metadata manager 52 operates to insert a key-value pair 64 associated with each data block 56 into a Cuckoo tree (not directly depicted) whenever the metadata for that data block 56 is updated. Each key-value pair 64 is keyed by the logical address 58 of its associated data block 56. For example, in one embodiment, the logical address 58 may be a combination of a 24-bit LUN identifier (not depicted) that identifies which LUN (not depicted) the data block belongs to and a 48-bit logical block address (not depicted) within that LUN. If the logical address 58 is also 8 bytes long, then each key-value pair 64 is 32 bytes long in one example embodiment.

Metadata manager 52 also operates to read, from the Cuckoo tree, a key-value pair 64 associated with a data block 56 whenever metadata manager 52 needs to access the metadata of that data block 56. Metadata manager 52 is able to insert or read key-value pair 64 into or from a Cuckoo tree by calling on Cuckoo manager 80.

Cuckoo manager 80 operates to manage the Cuckoo tree. A Cuckoo tree is a complex distributed data structure made up of a Cuckoo filter 70 (stored in memory 40), the open SKVS tree 54 (also stored in memory 40), the set of closed SKVSes 46 (stored in persistent storage 42) and the combined SKVS 48 (also stored in persistent storage 42). In some embodiments, the Cuckoo tree also includes a stash 86 stored in memory 40.

Cuckoo manager 80 operates to receive a key-value pair 64 for insertion in the Cuckoo tree and to apply a Cuckoo hash algorithm 82 to the key (which is the logical address 58 in typical embodiments) to index into the Cuckoo filter 70. Cuckoo hash 82 and Cuckoo filter 70 are known in the art, as described in "Cuckoo Filter: Practically Better Than Bloom," by Bin Fan, David G. Andersen, Michael Kaminsky, and Michael D. Mitzenmacher, included in CoNEXT' 14, <http://dx.doi.org/10.1145/2674005.2674994>, the entire contents and teachings of which are incorporated herein by this reference.

Cuckoo manager 80 operates to insert the received key-value pair 64 into the open SKVS 54 and to place an SKVS pointer 76 that points to the current open SKVS 54 into the Cuckoo filter 70 in connection with the logical address 58 key.

Cuckoo filter 70 includes a set of entries 72 (depicted as entries 72(1), 72(*b*), 72(*c*), . . . , 72(M)). Cuckoo filter 72 is configured to hold no more than a maximum number 84 of entries 72. Each entry 72 includes a key signature 74 as well as a pointer 76 to a particular SKVS 46, 54 in which a key-value pair 64 is stored that is indexed by the same logical address 58 that was used to index into the Cuckoo filter 70 upon that entry 72 having been inserted. Each SKVS 46, 54 has a unique identifier that can be used to point to that SKVS 46, 54. Since each closed SKVS 46 in persistent storage 42 was originally an open SKVS 54 stored in memory, even though the SKVS pointer 76 inserted into each entry 72 always points to open SKVS 54 upon insertion, once the open SKVS 54 is closed and moved into persistent storage 42 as a new closed SKVS 46 (having the same unique identifier as was used when it was an open SKVS 54), the SKVS pointer 76 becomes important. In some embodiments, each entry 72 is 3 bytes long.

In some embodiments (not depicted), Cuckoo filter 70 may be subdivided into a set of buckets (not depicted), each bucket being configured to hold up to a predetermined number (e.g., 2, 4, etc.) of entries 72 that share a common key signature 74 as generated by Cuckoo hash 82. It should be noted that although two entries 72 that share a common key signature 74 could both relate to the same logical address 58, since the logical address 58 is hashed, it is also possible that the two entries 72 with a common key signature 74 relate to two different logical addresses 58.

In some embodiments, if Cuckoo manager 80 is not able to successfully place an entry 72 into the Cuckoo filter 70 due to the appropriate bucket(s) being full, instead of placing entry 72 into the Cuckoo filter, Cuckoo manager 80 places an entry 80 (depicted as entries 88(*a*), . . . ) into a stash 86, which is simple table. Entry 88 includes the same SKVS pointer 76 as the entry 72 that would have been inserted into Cuckoo filter 70 were the appropriate bucket(s) not full, but instead of being keyed by hashed key signature 74, entry 88 is keyed directly by the logical address 58.

Cuckoo manager 80 also operates to invoke merge manager 90 as a background process to close an open SKVS 54 when it gets full (i.e., once it reaches a configured maximum SKVS size 92, representing the number of key-value pairs 64 that an SKVS 46, 54 can hold, e.g., 256 or $2^{17}$) and to move it out of memory 40 into persistent storage 42 as a new closed SKVS 46 having the same identifier as when it was an open SKVS 54. In some embodiments, the identifiers are monotonically increasing consecutive integers up to a maximum permitted number 91 of SKVSes 46, 54 (e.g., 1024), after which the identifiers may wrap back down to zero.

Merge manager 90 also operates to assess how many closed SKVSes 46 there are in persistent storage 42 at any given time, so that once that number reaches a merge threshold 94 (e.g., 512 closed SKVSes 46, which is often set to be half of the maximum permitted number 91 of SKVSes 46, 54), merge manager 90 is triggered to merge all of the merge threshold 94 number of closed SKVSes 46 in persistent storage 42 into the combined SKVS 48. Combined SKVS 48 may be much larger than any of the ordinary open or closed SKVSes 46, 54. For example, while the maximum SKVS size 92 may be $2^{17}$, the maximum combined SKVS size 93 is typically $2^{30}$, which is over 8,000 times larger. In some embodiments, the closed SKVSes 46 are all merged directly into a preexisting combined SKVS 48, while in other embodiments, the closed SKVSes 46 and the preexisting combined SKVS 48 are all merged into a temporary combined SKVS 48', which is then swapped to become the regular combined SKVS 48 upon the merge operation completing. The merging process makes sure to eliminate key-value pairs 64 with duplicate logical addresses 58, only merging the most recent key-value pair 64 in any such set of duplicates (which, in some embodiments, may be identified using the monotonically-increasing integer identifier of each SKVS 46, 54). Although this merging may take a significant amount of time to complete, new closed SKVSes 46 that are not part of the merge operation may continue to accrue within persistent storage 42.

In operation, if metadata manager 52 wants to obtain the metadata entry 60 for a given logical address 58 (e.g., to find the physical address 62 at which that logical address is stored), it sends the logical address to the Cuckoo manager 80 so that Cuckoo manager 80 can search the Cuckoo tree for the appropriate key-value pair 60. Cuckoo manager 80 does this by first checking the stash 86 for an entry 88 indexed by the given logical address 58 (in embodiments in which a stash 86 is used). If no such entry 88 is found in the stash 86, then Cuckoo manager 80 indexes into the Cuckoo filter 70 using the given logical address 58 and the Cuckoo hash 82 to obtain a set of entries 72 that are potential matches. Since each such entry 72 has an SKVS pointer 76, and since the age of the SKVS 46, 54 to which it points can be estimated by its monotonically-increasing integer identifier, Cuckoo manager 80 first looks up the logical address 58 in the most recent SKVS 46, 54, proceeding to the next most recent SKVS 46 if a matching key-value pair 64 is not found in the previous one. Thus, by finding the most recent SKVS 46, 54 that includes a key-value pair 64 keyed by the logical address 58, Cuckoo manager 80 identifies the most recent version of the metadata entry 60 for the given logical address 58.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 42 is configured to store programs and data even while the computing device 32 is powered off. The OS and the applications 50, 52, 80, 90 are typically stored in this persistent storage portion of memory 40 or on persistent storage 42 so that they may be loaded into a system portion of memory 40 from this persistent storage portion of memory 40 or persistent storage 42 upon a restart. These applications 50, 52, 80, 90 when stored in non-transient form either in the volatile portion of memory 40 or on persistent storage 42 or in persistent portion of memory 40, form a computer program product. The processing circuitry 34 running one or more of these applications or drivers 50, 52, 80, 90 thus forms a specialized circuit constructed and arranged to carry out the various processes described herein.

In some embodiments, techniques may be used to persist open SKVS 54, Cuckoo filter 70, and/or stash 86 even though they are stored within memory 40 in order to protect against metadata loss in the event of a power failure or other catastrophic event. Thus, these data structures may be stored within a battery-backed portion of memory 40, they may be mirrored onto another computing device 32, or they may be regularly backed up onto persistent storage 40. In some embodiments, the closed SKVSes 46 and/or combined SKVS 48 are also protected against loss by being stored using a RAID or similar scheme.

FIG. 2 illustrates an example method 100 performed by I/O stack 50, metadata manager 52, and Cuckoo manager 80 running on processing circuitry 34 of computing device 32 in conjunction with other applications, storage/network interface circuitry 36, and persistent storage 42 for responding to storage requests that involve accessing metadata entries 60 stored in a Cuckoo tree. It should be understood that any time a piece of software (e.g., I/O stack 50, metadata manager 52, Cuckoo manager 80, merge manager 90, OS, etc.) is described as performing a method, process, step, or function, in actuality what is meant is that a computing device (e.g., computing device 32) on which that piece of software is running performs the method, process, step, or function when executing that piece of software on its processing circuitry 34. It should be understood that one or more of the steps or sub-steps of method 100 may be omitted in some embodiments. Similarly, in some embodiments, one or more steps or sub-steps may be combined together or performed in a different order. Steps 115 and 120 and sub-steps 142 and 144 of method 100 marked with dashed lines may be deemed to be either optional or representative of alternative embodiments. Method 100 is performed by computing device 32 in communication with persistent storage 42.

In step 110, I/O stack 50 receives a storage command directed at a data block 56 having a given logical address 58.

If the storage command is a read or modify command, metadata manager 52 needs to obtain the physical address 62 where the data block 56 is stored in order to be able to read the data block 56 from LUN data 44 on persistent storage 42. Thus, in those situations, operation proceeds with step 115, in which method 300 (described below in connection with FIG. 4) is performed.

If the storage command is a write command, then, in step 120, metadata manager 52 assigns a physical address 62 where the data block 56 is to be stored within LUN data 44 on persistent storage 42.

Then, in step 130, metadata manager 52 creates (in the case of a write command) or updates (in the case of a modify command) a metadata entry 60 for the data block 56, the metadata entry 60 including the physical address 62 as well as other metadata, depending on the embodiment. Metadata manager 52 then calls Cuckoo manager 80 to insert the metadata entry 60 (either newly-created or newly-updated) within a key-value pair 64 into the Cuckoo tree by performing steps 140-155.

In step 140, Cuckoo manager 80 stores key-value pair 64 within open SKVS (e.g., a B-tree) of an ordered plurality of SKVSes 46, 54, each SKVS 46, 54 having a unique identifier, the key-value pair 64 including the logical address 58 as the key and the metadata entry 60 as the value. In some embodiments (indicated by sub-step 142), there is always at most one open SKVS 54 in memory 40 at a time. In other embodiments (indicated by sub-step 144), there may be more than one open SKVS 54 in memory 40 at a time. For example, each processor or core or thread may be assigned its own separate open SKVS 54 to minimize thread contention. Thus, in one example embodiment there may be two open SKVSes 54 in memory 50 at a time, while in another example embodiment there may be four open SKVSes 54 in memory 50 at a time.

Then, in step 150, Cuckoo manager 80 attempts to place an entry 72 within a Cuckoo filter 70 based on the logical address 58 as the key (e.g., using a key signature 74 and a Cuckoo hash 82), the entry 72 including the identifier of the open SKVS 54 into which the key-value pair 64 was stored in step 140 as its SKVS pointer 76. If this insertion succeeds, then operation proceeds directly with step 160. However, if this insertion fails (e.g., because the appropriate bucket(s) is/are full), then operation proceeds with step 155, in which Cuckoo manager 80 places an entry 88 into an overflow table (e.g., stash 86) keyed by the logical address 58 with a value of the pointer 76 to the open SKVS 54 in which the key-value pair 64 was stored in step 140. Operation then proceeds with step 160.

In step 160, metadata manager 52 and/or I/O stack 50 proceed with the remainder of processing the storage command as is well-known in the art.

FIG. 3 illustrates an example method 200 performed by Cuckoo manager 80 and merge manager 90 running on processing circuitry 34 of computing device 32 in conjunction with other applications, storage/network interface circuitry 36, and persistent storage 42 for updating and merging a Cuckoo tree. It should be understood that one or more of the steps or sub-steps of method 200 may be omitted in some embodiments. Similarly, in some embodiments, one or more steps or sub-steps may be combined together or performed in a different order. Sub-steps 232, 245, 252, and 254 of method 200 marked with dashed lines may be deemed to be either optional or representative of alternative embodiments. Method 200 is performed by computing device 32 in communication with persistent storage 42.

In step 210, Cuckoo manager 80 inserts a key-value pair 64 within an open SKVS 54 (see above at step 140). Then, in step 220, merge manager 90 checks to see whether the open SKVS 54 has reached the maximum permitted SKVS size 92. If it hasn't, Cuckoo manager 80 is able to continue its normal operation of inserting key-value pair 64 within an open SKVS 54.

Otherwise, in step 230, merge manager 90 closes the open SKVS 54 that has reached the maximum permitted SKVS size 92 and opens a new open SKVS 54 in its place. In some embodiments, step 230 includes sub-step 232 in which the open SKVS 54 that was just closed is moved into persistent storage 42 as a new closed SKVS 46. In some embodiments, in order to close the open SKVS 54, merge manager 90 must wait until outstanding operations pending on the open SKVS 54 terminate, after which no modifications to that SKVS 54 are permitted until it is deleted after merger (see step 260 below).

Then, in step 240, merge manager 90 checks to see whether the number of closed SKVSes 46 on persistent storage 42 has reached the merge threshold 94. If it hasn't, Cuckoo manager 80 is able to continue its normal operation of inserting key-value pair 64 within an open SKVS 54.

Otherwise, in step 250, merge manager 90 merges all of the merge threshold 94 number of closed SKVSes 46 within persistent storage 42 into the combined SKVS 48 in persistent storage 42, keeping the newest key-value pairs 64 in case of multiple pairs with the same key 58. In some embodiments, step 250 includes sub-step 252 in which merge manager 90 merges the closed SKVSes 46 directly into the combined SKVS 48 that may already exist. In other embodiments, step 250 includes sub-step 254 in which merge manager 90 merges the closed SKVSes and the preexisting combined SKVS 48 into a new combined SKVS 48' that eventually replaces the combined SKVS 48 upon completion of the merge. In some embodiments, step 250 includes utilizing an iterator for each closed SKVS 46 being merged as well as an iterator for the combined SKVS 48 as is well-known in the art.

Upon completion of the merge (or, in some embodiment, concurrently), merge manager 90 performs step 290 in which it deletes the closed SKVSes 46 that were just merged (and the old combined SKVS 48 in the embodiments of sub-step 254) and removes entries 72 from Cuckoo filter 70 and entries 88 from stash 86 that point to the closed SKVSes 46 that were just merged.

FIG. 4 illustrates an example method 300 performed by Cuckoo manager 80 and metadata manager 52 running on processing circuitry 34 of computing device 32 in conjunction with other applications, storage/network interface circuitry 36, and persistent storage 42 for accessing metadata of a data block 56 which is logically-positioned at logical address 58 from a Cuckoo tree. It should be understood that one or more of the steps or sub-steps of method 300 may be omitted in some embodiments. Similarly, in some embodiments, one or more steps or sub-steps may be combined together or performed in a different order. Steps 310, 315 of method 300 marked with dashed lines may be deemed to be either optional or representative of alternative embodiments. Method 300 is performed by computing device 32 in communication with persistent storage 42.

Method 300 is typically performed when the metadata entry 60 of a data block 56 is needed when only the logical address 58 is known (but not the physical address 62 or other metadata).

In some embodiments, in step 310, Cuckoo manager 80 looks up the logical address 58 in the stash 86, obtaining a pointer 76 to an SKVS 46, 54 if there is an entry 88 in the stash 86 with that logical address 58. If such an entry 88 is found, then, in step 315, Cuckoo manager 80 looks up the logical address 58 in the identified SKVS 46, 54 to obtain a key-value pair 64 indexed by the logical address 58, with operation then proceeding to step 350. If an entry 88 is not found in the stash 86 (and in embodiments in which step 310 is not performed at all), operation proceeds with step 320.

In step 320, Cuckoo manager 80 looks up a signature 74 of the logical address 58 in the Cuckoo filter 70 to see if there is one or more entry 72 in the Cuckoo filter 70 indexed by the signature 74. If at least one entry 72 is found, then operation proceeds with step 330. Otherwise, operation skips to step 340.

In step 330, starting with the entry 72 (of the one or more entries 72 in the Cuckoo filter 70 indexed by the signature 74) having a pointer 76 to the most-recent SKVS 46, 54 of all of those entries 72 (and then progressing to older ones if necessary), Cuckoo manager 80 opens the SKVS 46, 54 pointed to by that entry 72 and looks up the logical address 58 in that SKVS 46, 54 to obtain a key-value pair 64 indexed by the logical address 58. Cuckoo manager 80 stops once a key-value pair 64 indexed by the logical address 58 is found in an SKVS 46, 54 and proceeds to step 350. If none is found after searching all the SKVSes 46, 54 identified by all of the entries 72 found in step 320, then operation proceeds with step 340.

In step 340, Cuckoo manager 80 looks up the logical address 58 in the combined SKVS 48 to obtain the key-value pair 64 therein that is indexed by the logical address 58 (assuming that there is one there). Operation then proceeds with step 350.

In step 350, Cuckoo manager 80 returns the key-value pair 64 obtained in the previous step (step 315, 330, or 340 as the case may be) and metadata manager 52 extracts the metadata entry 60 from that obtained key-value pair 64, proceeding to step 360.

In step 360, metadata manager 52 extracts the physical address 62 from the metadata entry 60, which allows method 100 to continue with step 130 in the event of a modify command. If method 300 was invoked by a read command in step 115 of method 100, then instead of operation continuing with step 130, operation instead skips to step 160 in which the read command is fulfilled as is well-known in the art.

Thus, techniques have been presented for storing block metadata entries 60 using a scheme that allows very many entries 60 to be written efficiently and searched quickly with low thread contention. This result may be accomplished by using a Cuckoo filter 70 to build a Cuckoo tree to store the metadata. This scheme may also be applied to other contexts in which a database with frequent small entries is needed.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described for using a Cuckoo tree in the context of data storage, in some embodiments, Cuckoo manager 80 may be configured to operate a Cuckoo tree similar to as described (but possibly using another value as the key rather than using the logical address 58) in other contexts, such as in the context of a database. In these embodiments metadata entry may not contain a physical address 62, and Cuckoo manager 80 perform steps 140-145 of FIG. 1, method 200 of FIG. 3, and/or steps 310-350 of FIG. 4.

As another example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of storing block-based metadata in a data storage system (DSS), the method comprising:
   receiving a request to write a block of data to a logical address of the DSS;
   assigning a physical address within the DSS where the block of data is to be stored;
   creating a metadata entry for the block of data, the metadata entry including the physical address;
   storing a key-value pair within a sorted key-value structure (SKVS) of an ordered plurality of SKVSes, each SKVS having a unique identifier, the key-value pair including the logical address as the key and the metadata entry as the value;
   placing an entry within a Cuckoo filter based on the key value, the entry including the identifier of the SKVS in which the key-value pair was stored; and
   subsequently accessing the data by:
     locating the metadata entry with reference to the Cuckoo filter and
     locating the data with reference to the physical address in the metadata entry.

2. The method of claim 1 wherein the method further comprises:
   in response to storing the key-value pair within the SKVS, determining that the SKVS has reached a predetermined maximum size;
   in response to determining that the SKVS has reached the predetermined maximum size, closing the SKVS to new key-value pairs;
   in response to a predetermined number of SKVSes of the of the plurality of SKVSes becoming closed to new key-value pairs:
     merging the predetermined number of SKVSes that have become closed to new key-value pairs into a combined SKVS, wherein merging includes, for each key found within any of the predetermined number of SKVSes, inserting a newest key-value pair using that key from the predetermined number of SKVSes into the combined SKVS and
     removing entries from the Cuckoo filter that included identifiers of any of the predetermined number of SKVSes.

3. The method of claim 2 wherein merging the predetermined number of SKVSes that have become closed to new key-value pairs into the combined SKVS includes:

creating the combined SKVS; and
further merging a previous version of the combined SKVS into the combined SKVS.

4. The method of claim 2,
wherein the combined SKVS already contained preexisting key-value pairs prior to merging the predetermined number of SKVSes that have become closed to new key-value pairs into the combined SKVS; and
wherein merging the predetermined number of SKVSes that have become closed to new key-value pairs into the combined SKVS includes replacing a preexisting key-value pair within the combined SKVS with a newer key-value pair from one of the predetermined number of SKVSes that have become closed to new key-value pairs.

5. The method of claim 2 wherein the predetermined number is half of a predetermined maximum number of SKVSes permitted within the ordered plurality of SKVSes.

6. The method of claim 2 wherein the method further comprises:
receiving a first request to read a first block of data from the DSS;
in response to receiving the first request:
searching for an entry within the Cuckoo filter keyed by the logical address of that request,
finding a set of entries within the Cuckoo filter keyed by the logical address of that request, each entry of the set of entries including a respective SKVS identifier,
indexing into an SKVS identified by a most recent SKVS identifier found within the set of entries using the logical address of that request, and
obtaining a physical address within the DSS from which to read the first block of data with reference to a metadata entry of the identified SKVS indexed by the logical address of that request;
receiving a second request to read a second block of data from the DSS; and
in response to receiving the second request:
searching for an entry within the Cuckoo filter keyed by the logical address of that request, each entry including a respective SKVS identifier,
failing to find a key-value pair keyed by the logical address of that request within any SKVS identified by any entry within the Cuckoo filter keyed by the logical address of that request,
in response to failing to find the key-value pair, indexing into the combined SKVS using the logical address of that request, and
obtaining a physical address within the DSS from which to read the second block of data with reference to a metadata entry of the combined SKVS indexed by the logical address of that request.

7. The method of claim 6 wherein the method further comprises
receiving a third request to read a third block of data from the DSS; and
in response to receiving the third request, without searching for an entry within the Cuckoo filter keyed by the logical address of that request:
searching for an entry within the a table keyed by the logical address of that request,
finding an entry within the table keyed by the logical address of that request, the entry including an SKVS identifier,
indexing into the SKVS identified by the SKVS identifier using the logical address of that request, and
obtaining a physical address within the DSS from which to read the third block of data with reference to a metadata entry of the identified SKVS indexed by the logical address of that request.

8. A computer program product comprising a non-transitory computer-readable storage medium storing a set of instructions, which, when performed by a computing device, cause the computing device to store block-based metadata in a data storage system (DSS) by:
receiving a request to write a block of data to a logical address of the DSS;
assigning a physical address within the DSS where the block of data is to be stored;
creating a metadata entry for the block of data, the metadata entry including the physical address;
storing a key-value pair within a sorted key-value structure (SKVS) of an ordered plurality of SKVSes, each SKVS having a unique identifier, the key-value pair including the logical address as the key and the metadata entry as the value;
placing an entry within a Cuckoo filter based on the key value, the entry including the identifier of the SKVS in which the key-value pair was stored; and
subsequently accessing the data by:
locating the metadata entry with reference to the Cuckoo filter and
locating the data with reference to the physical address in the metadata entry.

9. The computer program product of claim 8 wherein the set of instructions, when performed by the computing device, further causes the computing device to:
in response to storing the key-value pair within the SKVS, determine that the SKVS has reached a predetermined maximum size;
in response to determining that the SKVS has reached the predetermined maximum size, close the SKVS to new key-value pairs;
in response to a predetermined number of SKVSes of the of the plurality of SKVSes becoming closed to new key-value pairs:
merge the predetermined number of SKVSes that have become closed to new key-value pairs into a combined SKVS, wherein merging includes, for each key found within any of the predetermined number of SKVSes, inserting a newest key-value pair using that key from the predetermined number of SKVSes into the combined SKVS and
remove entries from the Cuckoo filter that included identifiers of any of the predetermined number of SKVSes.

10. The computer program product of claim 9 wherein the predetermined number is half of a predetermined maximum number of SKVSes permitted within the ordered plurality of SKVSes.

11. The computer program product of claim 9 wherein the set of instructions, when performed by the computing device, further causes the computing device to:
receive a first request to read a first block of data from the DSS;
in response to receiving the first request:
search for an entry within the Cuckoo filter keyed by the logical address of that request,
find a set of entries within the Cuckoo filter keyed by the logical address of that request, each entry of the set of entries including a respective SKVS identifier, index into an SKVS identified by a most recent SKVS identifier found within the set of entries using the logical address of that request, and obtain a physical address within the DSS from which to read the first block of data with reference to a metadata entry of the identified SKVS indexed by the logical address of that request;

receive a second request to read a second block of data from the DSS; and in response to receiving the second request:

search for an entry within the Cuckoo filter keyed by the logical address of that request, each entry including a respective SKVS identifier, fail to find a key-value pair keyed by the logical address of that request within any SKVS identified by any entry within the Cuckoo filter keyed by the logical address of that request, in response to failing to find the key-value pair, index into the combined SKVS using the logical address of that request, and obtain a physical address within the DSS from which to read the second block of data with reference to a metadata entry of the combined SKVS indexed by the logical address of that request.

12. A data storage system (DSS) for storing block-based metadata comprising:

a set of persistent storage device that provide a pool of persistent storage; and a computing device communicatively-connected to the set of persistent storage devices, the computing device being configured to perform the following operations:

receiving a request to write a block of data to a logical address of the DSS;

assigning a physical address within the pool of persistent storage where the block of data is to be stored;

creating a metadata entry for the block of data, the metadata entry including the physical address;

storing a key-value pair within a sorted key-value structure (SKVS) of an ordered plurality of SKVSes, each SKVS having a unique identifier, the key-value pair including the logical address as the key and the metadata entry as the value;

placing an entry within a Cuckoo filter based on the key value, the entry including the identifier of the SKVS in which the key-value pair was stored; and subsequently accessing the data by:

locating the metadata entry with reference to the Cuckoo filter and locating the data within the pool of persistent storage with reference to the physical address in the metadata entry.

13. The DSS of claim 12 wherein the computing device is further configured to perform the following operations:

in response to storing the key-value pair within the SKVS, determining that the SKVS has reached a predetermined maximum size;

in response to determining that the SKVS has reached the predetermined maximum size, closing the SKVS to new key-value pairs;

in response to a predetermined number of SKVSes of the of the plurality of SKVSes becoming closed to new key-value pairs:

merging the predetermined number of SKVSes that have become closed to new key-value pairs into a combined SKVS, wherein merging includes, for each key found within any of the predetermined number of SKVSes, inserting a newest key-value pair using that key from the predetermined number of SKVSes into the combined SKVS and removing entries from the Cuckoo filter that included identifiers of any of the predetermined number of SKVSes.

14. The DSS of claim 13 wherein the predetermined number is half of a predetermined maximum number of SKVSes permitted within the ordered plurality of SKVSes.

15. The DSS of claim 13 wherein the computing device is further configured to perform the following operations:

receiving a first request to read a first block of data from the DSS;

in response to receiving the first request:

searching for an entry within the Cuckoo filter keyed by the logical address of that request, finding a set of entries within the Cuckoo filter keyed by the logical address of that request, each entry of the set of entries including a respective SKVS identifier, indexing into an SKVS identified by a most recent SKVS identifier found within the set of entries using the logical address of that request, and obtaining a physical address within the DSS from which to read the first block of data with reference to a metadata entry of the identified SKVS indexed by the logical address of that request;

receiving a second request to read a second block of data from the DSS; and in response to receiving the second request:

searching for an entry within the Cuckoo filter keyed by the logical address of that request, each entry including a respective SKVS identifier, failing to find a key-value pair keyed by the logical address of that request within any SKVS identified by any entry within the Cuckoo filter keyed by the logical address of that request, in response to failing to find the key-value pair, indexing into the combined SKVS using the logical address of that request, and obtaining a physical address within the DSS from which to read the second block of data with reference to a metadata entry of the combined SKVS indexed by the logical address of that request.

* * * * *